(12) United States Patent
Nelson et al.

(10) Patent No.: US 8,456,308 B2
(45) Date of Patent: Jun. 4, 2013

(54) ATTACHMENT DETECTION METHOD AND SYSTEM

(75) Inventors: Mark A. Nelson, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/815,736

(22) Filed: Jun. 15, 2010

(65) Prior Publication Data

US 2011/0304464 A1 Dec. 15, 2011

(51) Int. Cl.
*G08B 23/00* (2006.01)
*G08B 21/00* (2006.01)
*G05B 19/00* (2006.01)

(52) U.S. Cl.
USPC ........ 340/573.1; 340/5.3; 340/5.31; 340/680; 340/686.5; 340/686.6

(58) Field of Classification Search
USPC ............... 340/573.1, 3.1, 5.2, 5.21, 5.3, 5.24, 340/5.31, 524, 538, 500, 540, 686.1, 679, 340/680, 686.5, 686.6
See application file for complete search history.

(56) References Cited

U.S. PATENT DOCUMENTS

| | | | |
|---|---|---|---|
| 5,015,086 A | | 5/1991 | Okaue et al. |
| 5,023,597 A | | 6/1991 | Salisbury et al. |
| 5,164,707 A | | 11/1992 | Rasmussen et al. |
| 5,563,581 A | * | 10/1996 | Kats .............................. 340/567 |
| 6,853,303 B2 | * | 2/2005 | Chen et al. .................. 340/573.1 |
| 6,856,852 B1 | * | 2/2005 | Bruinsma et al. ............. 700/177 |
| 7,401,918 B2 | | 7/2008 | Howell et al. |
| 7,890,235 B2 | * | 2/2011 | Self et al. ......................... 701/50 |
| 8,208,681 B2 | * | 6/2012 | Heller et al. ................... 382/100 |
| 2006/0115130 A1 | | 6/2006 | Kozlay et al. |
| 2009/0147215 A1 | | 6/2009 | Howell et al. |
| 2010/0045464 A1 | * | 2/2010 | Knopf et al. ............... 340/573.1 |

OTHER PUBLICATIONS

Kazuhiro Hotta; A Robust Face Detector Under Partial Occlusion; 2004 International Conference on Image Processing (ICIP); 0-7803-8554-3/94 copyright 2004 IEEE; pp. 597-600.
Sang-Ki Kim et al.; Face Recognition Incorporating Ancillary Information; Hindawi Publishing Corporation, EURASIP Journal on Advances in Signal Processing, vol. 2008, Article ID 312849, 11 pages, doi:10.1155/2008/312849.
Arai et al.; Communication Aid with Human Eyes Only; p. 12.

* cited by examiner

*Primary Examiner* — Daniel Wu
*Assistant Examiner* — Mancil Littlejohn
(74) *Attorney, Agent, or Firm* — Schmeiser, Olsen & Watts; Anna Linne

(57) ABSTRACT

An attachment detection method and system. The method includes receiving, by a computer processor of a computing system, attachment data describing different devices associated with and attachable to an electro/mechanical apparatus. The computer processor retrieves first data describing a first attachment device currently attached to the electro/mechanical apparatus and analyzes the attachment data with respect to the first data. In response to the analysis, the computer processor determines specified protective gear required for operation of the electro/mechanical apparatus and the first attachment device. The computer processor generates indication data specifying required usage of the specified protective gear and presents the indication data to a user.

20 Claims, 3 Drawing Sheets

ATTACHMENT DETECTION METHOD AND SYSTEM

FIELD OF THE INVENTION

The present invention relates to a method and associated system for detecting and analyzing an attachment device for an electro/mechanical apparatus.

BACKGROUND OF THE INVENTION

Performing functions associated with different devices typically comprises an inefficient process with little flexibility. A device is typically operated without any regard to potential issues. Using a device without any regard to potential issues may result in user safety issues.

SUMMARY OF THE INVENTION

The present invention provides a method comprising: receiving, by a computer processor of a computing system, attachment data describing different devices associated with and attachable to an electro/mechanical apparatus; retrieving, by the computer processor from a detection device, first data describing a first attachment device currently attached to the electro/mechanical apparatus, wherein the first data describes a type and usage for the first attachment; analyzing, by the computer processor, the attachment data with respect to the first data; determining, by the computer processor in response to results of the analyzing, a first match between the attachment data and the first data; determining, by the computer processor in response to the first match, first specified protective gear required for operation of the electro/mechanical apparatus and the first attachment device currently attached to the electro/mechanical apparatus; generating, by the computer processor, first indication data specifying required usage of the first specified protective gear; and presenting, by the computer processor to a user of the electro/mechanical apparatus, the first indication data.

The present invention provides a method comprising: receiving, by a computer processor of a computing system, attachment data describing different devices associated with and attachable to an electro/mechanical apparatus; retrieving, by the computer processor from a detection device, first data describing a first attachment device currently attached to the electro/mechanical apparatus, wherein the first data describes a type and usage for the first attachment; first analyzing, by the computer processor, the attachment data with respect to the first data; determining, by the computer processor in response to results of the analyzing, that a match does not exist between the attachment data and the first data; second analyzing, by the computer processor, the first data with respect to override data; determining, by the computer processor in response to results of the second analyzing, an override status associated operation of the electro/mechanical apparatus and the first attachment device currently attached to the electro/mechanical apparatus; and presenting, by the computer processor to a user of the electro/mechanical apparatus, the override status.

The present invention advantageously provides a simple method and associated system capable of performing functions associated with different devices.

DETAILED DESCRIPTION OF THE INVENTION

Figure 1:
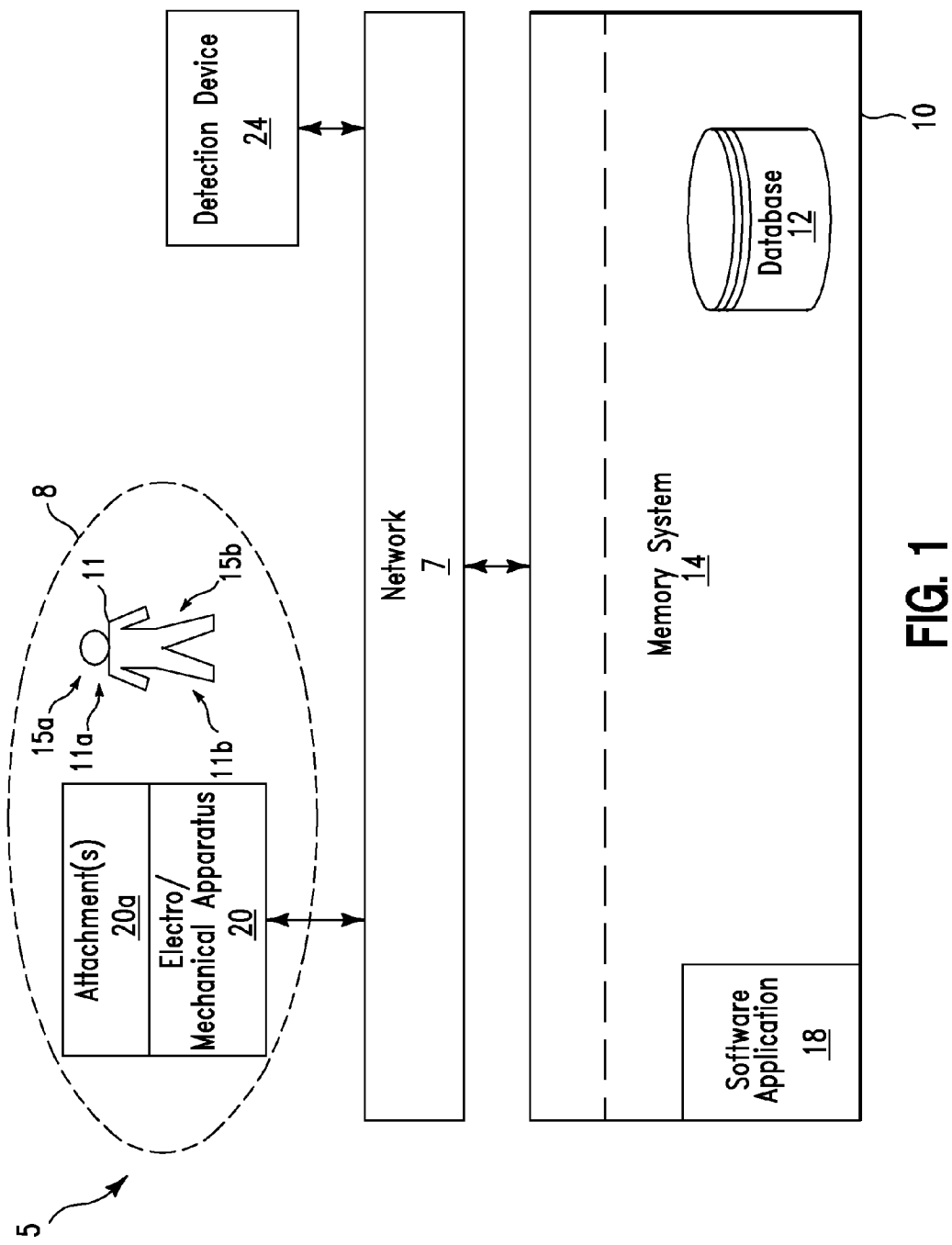
FIG. 1 illustrates a system for detecting and analyzing an attachment(s) for an electro/mechanical apparatus, in accordance with embodiments of the present invention.

FIG. 1 illustrates a system 5 for detecting and analyzing an attachment(s) 20a (device) for an electro/mechanical apparatus 20, in accordance with embodiments of the present invention. Electro/mechanical apparatus 20 may comprise any electro/mechanical device requiring a user to wear protective gear 15a and 15b. For example, apparatus 20 may comprise, inter alia, a saw, a drill, welding equipment, laboratory equipment, chemical equipment, machine shop equipment, automotive repair equipment, etc. Attachment(s) 20a may comprise any type of attachable/removable device for electro/mechanical apparatus 20. For example, attachment(s) 20a may comprise, inter alia, a saw blade, drill bits, welding torch tips, taps, etc. Protective gear 15a may include any protective gear for protection a head/face area 11a of user 11 such as, inter alia, safety eyewear, respiratory equipment, etc. Protective gear 15b may include any protective gear for protection a body area 11b of user 11 such as, inter alia, body protective gear (e.g., gloves, boots, fall protection, etc), etc. System 5 retrieves detects and/or retrieves data from attachment(s) 20a in order to determine a type and usage for attachment(s) 20a. For example, system 5 may detect that attachment(s) 20a comprises a fine tooth saw blade for use in cutting metal. This information may be used to indicate (to a user) a specific type of protective gear 15a and 15b to be worn during operation of electro/mechanical apparatus 20 with attachment(s) 20. Likewise, there may be certain types of electro/mechanical apparatuses (e.g., electro/mechanical apparatus 20 in FIG. 1) that have a number of uses that vary when using different attachments, such as a type of blade or bit. For example, a saw blade comprising short teeth may be used for finish work. The short teeth may create and throw some dust (i.e., from the blade) but do not throw large material fragments. However, a saw blade comprising large teeth (e.g., a ripping blade) may create and throw large fragments (i.e., from the blade). The differences between materials generated by the different blades (during use) may require the use of different types of protective gear 15a and 15b. For example, use of the saw blade comprising large teeth may require the use of higher strength/rated safety glasses than use of the saw blade comprising the short teeth. System 5 comprises a detection device (e.g., an infrared camera) and a computing apparatus 10 enabled to examine a profile associated with attachment(s) 20a and compare the profile to a database (e.g., comprising manufacturer data) to determine a type and usage of attachment(s) 20a and a correct safety gear type. System 5 enables a method to determine a current use of a multipurpose device (e.g., electro/mechanical apparatus 20) by programmatically examining the device's current attachment (e.g., a saw blade, drill bit, etc). In response, a policy driven engine may enable one or more actions (e.g., ensuring the proper level of safety gear is being worn based on use). Additionally, electro/mechanical apparatus 20 may comprise a setting dial for multiple uses. The multiple uses for apparatus 20 may require specified types and/or levels of protective gear 15a or 15b required (i.e., for user 11) for operation of apparatus 20. Additionally, system 5 may ensure that a user 11 (and/or additional users or bystanders) is correctly wearing one or more safety devices (i.e., associated with attachment(s) 20a) by sensing an appropriate safety equipment rating label within a unique zone (i.e., on user 11) for each safety device (e.g., based on a position in relation to users head/body or a facial recognition program).

Additionally, system 5 enables a process for determining that user 11 is wearing one or more safety devices properly (e.g., safety glasses over the user's 11 eyes). The aforementioned process may be performed by detecting a specified zone on the user. The specified zone may be determined by, inter alia, a triangulation process, a radar/optical process, etc.

System 5 of FIG. 1 comprises an electro/mechanical apparatus 20 (comprising an attached attachment(s)) and detection device 24 connected through a network 7 to a computing system 10. Alternatively, electro/mechanical apparatus 20 and detection device 24 may be directly connected to computing system 14 without network 7. Detection device 24 may comprise any type of detection device capable of detecting:

1. Detecting and analyzing attachment(s) 20a (i.e., a type and usage for attachment(s) 20a).
2. Detecting that user 11 is located within a specified proximity 8 (or area) of electro/mechanical apparatus 20.
3. Detecting that user 11 is correctly wearing any specified protective gear 15a and/or 15b (e.g., safety glasses are being worn over the user's eyes as opposed to being placed on the user's head).
4. Detecting that specified protective gear 15a and/or 15b includes unique markings indicating a correct type of protective gear associated with operating electro/mechanical apparatus 20 with attachment(s) 20a.
5. Detecting that the user is facing a proper direction with respect to electro/mechanical apparatus 20 (e.g., the user is looking at operating electro/mechanical apparatus 20 as opposed to looking away from electro/mechanical apparatus 20).
6. Detecting a user and/or bystander position with respect to electro/mechanical apparatus 20.

Detection device 24 may comprise, inter alia, a camera or any other type of optical device, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved detection and indication data and any log data. Software application 18 enables an optical inspection method as described by the following example:

1. Upon startup of electro/mechanical apparatus 20, a light emitting device generates a backlight for attachment(s) 20a (e.g., a saw blade).
2. Detection device (e.g., a camera) takes an optical image of the saw blade with the backlight.
3. The optical image is transmitted to (an analyzer portion) of computing system 10 for processing.
4. As a first embodiment (i.e., for an optical inspection), software application 18 examines a segment of the saw blade from the optical image to determine a number of teeth per inch.
   A. If the blade is smooth (i.e., does not comprise teeth), the blade is determined to be a masonry blade. Note that unlike blades with teeth, masonry blades wear the edges and become smaller with use. Therefore, a position of the backlight and the camera angle must accommodate the shrinking edges.
   B. If blade comprises teeth, a number of teeth may be determined by examining the optical image and extrapolating an inch of the edge segment by using a standard blade size for electro/mechanical apparatus 20 (e.g., 5¼ inch, 7½ inch, 11 inch, etc) and triangulation given a known distance between the camera (lense) and the blade. Note that a 10 inch rip blade may comprise less than 24 teeth per inch resulting in larger material fragments. Therefore, high impact eye protection should be worn. Likewise, if a 10 inch blade has 40 plus teeth, it is considered to be a smoother finish blade. Additionally, a more sophisticated algorithm, may further refine tooth configurations. For example, an algorithm (enable by software application 18) could recognize a direction of blade teeth. In this scenario, the blade comprises a recommended direction orientation. In the event that the blade is installed in a reverse orientation, software application flags this as a violation of use.
4. As a second embodiment (i.e., for an optical inspection), software application 18 enables an optical character recognition process to recognize a manufacturers unique marking (i.e., on the blade). The unique marking is compared to a table to convert manufacture markings to usage. The unique marking may be located in a location to avoid areas where the marking could be disturbed (e.g., a drill bit shaft (end or side), a center of a blade (under an attaching nut). The unique marking may be read with a small LED light and camera.
5. As a third embodiment (i.e., for an optical inspection), software application 18 enables a process for reading a unique set of hole markings in the attachment (e.g., the saw blade).
6. As a fourth embodiment (i.e., for an optical inspection), software application 18 enables an identification process using an RFID tag embedded or attached to the attachment (e.g., blade). The RFID tag may comprise a circular RFID tag located just outside an attaching nut for the blade. The RFID tag may be embedded/installed by a manufacturer or provided as an aftermarket product. In this embodiment, detection device comprises an RFID reader.

System 5 may perform the following process as follows:
1. Automatically detect a type of attachment (e.g., attachment 20a) on an electro/mechanical apparatus (electro/mechanical apparatus 20).
2. Automatically determine a type of protective gear to be used while operating the electro/mechanical apparatus with the detected type of attachment.
3. Automatically notify a user as to the type of protective gear to be used while operating the electro/mechanical apparatus with the detected type of attachment.
4. Automatically detect if one or more people (e.g., user 11) are wearing the correct protective gear properly (i.e., on a proper location/unique zone on user 11). For example, software application 18 may automatically detect if user 11 is wearing safety glasses in front of their eyes as opposed to on top of their forehead.
5. Automatically detect if one or more people have recently put on or taken the correct protective gear.
6. Enable an automatic safety (e.g., an off switch, a disengage clutch, etc) that prevents the electro/mechanical apparatus from being operated until the user has placed correct gear in a proper location.
7. Automatically detect if one or more people is wearing a correct level of protective gear.
8. Automatically detect if another person besides an operator of the electro/mechanical apparatus is in close proximity to the electro/mechanical apparatus and if detected engage a safety mechanism to disable the electro/mechanical apparatus until the other person is no longer in close proximity to the electro/mechanical apparatus thereby preventing distractions.
9. Automatic detection to ensure that the user is located in a correct (i.e., approved) position with respect to the electro/mechanical apparatus (e.g., not behind the electro/mechanical apparatus) and enabling of a safety mechanism to enable or disable the electro/mechanical apparatus if the user is located in an incorrect position with respect to the electro/mechanical apparatus.

10. Enable a facial recognition process to validate proper protective gear is marked correctly.

Protective gear 15a and/or 15b may optionally be marked with a rating label based on different attachments(s) 20a. For example, safety glasses may be marked with a rating label associated with a masonry saw blade or a ripping saw blade. Additionally, system 5 may use a facial recognition process to ensure that protective gear 15a and/or 15b are on user 11 and then use an optical character recognition (OCR) process to recognize the markings on protective gear 15a and/or 15b. If the marking of protective gear 15a and/or 15b being worn is equal to or greater than a type required, continued use of the apparatus 20 is allowed. Otherwise computing system 10 may enable a safety device (e.g., to disable power to or a mechanical portion of apparatus) in order to disable operation.

System 5 may comprise the following components as described, infra:

1. An apparatus/machine to be operated. For example, electro/mechanical apparatus 20 (i.e., of FIG. 1) requiring the use of protective gear 15a and/or 15b.
2. An attachment(s) 20a (e.g., a saw blade) attachably connected to electro/mechanical apparatus 20.
3. Protective gear. For example, protective gear 15a and/or 15b such as, inter alia, eye protection (e.g., glasses/safety glasses, goggles, shields, etc), body protection, etc. As an example, eye protection gear may be marked with a rating label (i.e., based on different classes and levels of eye protection for different attachment(s) 20a). The rating label may be granular enough to distinguish a type of machine/environment/attachment, tint, fog prevention, anti-static, etc. The rating label may be included as part of a manufacturing process (painted, imprinted, etched, permanent label, etc) for the protective gear. Alternatively, existing safety glasses may be retrofitted with an eye protection rating level label verified by local safety team.
4. An image capture device such as detection device 24. For example, the image capture device may be a camera, an RFID reader, etc. The image capture device may be built into a machine or alternatively may be a part of a stand-alone device. The image capture device may comprise a plurality of image capture devices to monitor an area to determine if all individuals in an area are wearing proper protective gear (e.g., eyewear). The image capture device(s) may control a single or multiple safety devices. A position of the image capture device may determine a viewing angle and may be used to ensure that an operator of the apparatus/machine is in a proper (approved) working position to use the apparatus/machine. For example, in order to use a table saw, a user should be in front of the table saw (not behind the table saw) so the image capture device may be mounted to face forward. Additionally, additional portions of the protective gear (e.g., shields around the lenses) may be used to limit a field of view.
5. Recognition component of computing system 10 such as software application 18. The recognition component may be enabled to determine an attachment type and if a user's face is present and if he/she is wearing correct protective gear. In order to determine if the correct protective gear is being worn, optical character recognition code may be used to examine an image provided by the image capture device. The optical character recognition code will examine only an area of the user that is within a zone for the associated protective gear in order to determine if a required (or greater than a required) safety rating is present. If the safety rating of the protective gear being worn is equal to or greater than the safety rating needed by the apparatus/machine, the recognition component enables an operation of the apparatus/machine otherwise the apparatus/machine is put into an inoperable state. Additionally, the recognition component may be coded to recognize safety hats and masks as a face and to determine if the mask is in a correct position to protect a user's eyes. In order to associate a hat with a face, facial recognition code could find a body of a user using a facial recognition technique to detect/anticipate movement and occlusion. System 5 could then look for a safety rating in a specific eye zone based on a position of the body. If the mask is tilted up, a safety rating code will not be in the correct position to be detected and therefore the apparatus/machine may be put into an inoperable state. Additionally, authentication of a user identity may be required. Identifying a user allows detailed auditing of successful and unsuccessful use of an apparatus/machine and may be used to update safety and insurance records. The recognition component may be enabled to determine and/or generate the following:

A. A required level of safety equipment based on a type of attachment(s) 20a: A proper level of safety equipment may be determined based on equipment and environment. A specific level of safety equipment may be determined and required by country, state and/or company policies.

B. Facial profiles: In order to identify users for audit records or to compare against training, facial scans may be performed and results may be stored in a database (e.g., database 12). The facial profiles may be stored as, inter alia, a picture, an algorithmic extraction, etc. Additionally, the facial profiles may also be associated with a name and/or serial number.

C. Programmatic actions: Programmatic actions may be enabled to disable an operation of the apparatus/machine. The programmatic actions may enable a safety switch thereby eliminating current, disabling a clutch, inserting a blocking mechanism, etc. Programmatic actions may comprise a recovery action (i.e., to reactive operation of the apparatus/machine). Data identifying the recovery action may be stored for future reference. Programmatic actions may be state driven. For example, a first programmatic action when starting an apparatus/machine will not allow starting and will cause an indicator light to blink and a second programmatic action (i.e., if the apparatus/machine is already in use) may cause a safety block to drops in place (i.e., to disable the apparatus/machine).

D. Audit records: Audit records may be generated at various levels (e.g., a number of violations, users that violated policies, a time/date of violations, etc). The audit records may be used to validate adherence to governmental and corporate safety regulations and to reduce a price of an insurance policy. An optical image could be captured into memory when person violates safety policies, as a different means of enforcement, if a full facial recognition program is not enabled. The images could be accessed by a local safety representative to handle.

6. Safety device(s) comprising a mechanism for disabling and enabling a use of an apparatus/machine (e.g., a switch (e.g., a relay, a contactor, etc), an engage clutch, a safety shield lowered to prevent use, etc). The safety device(s), computing system 10 (comprising the recognition component), and the image capture device (i.e., detection 24 device) may be integrated into the apparatus/machine. Alternatively, the safety device(s), computing system 10 (comprising the recognition component), and the image capture device (i.e., detection 24 device) may be a stand-alone unit comprising computing system 10 and the image capture device contained in a device and connected to the apparatus/machine by hardwiring into electrical connections or as a switchable plug connection between an electrical cord and an outlet.

7. Optional output devices: Computing system 10 may enable requests (i.e., for signaling that the apparatus/machine has or will be put into an inoperable state due to lack of/or incorrect positioning of protective gear 15a and/or 15b with respect to attachment(s) 20a) to output devices such as, inter alia:

A. Speakers broadcasting a tone or audio/MP3/WAV message.
B. Lights that change colors or that flash.
C. Display device(s) that present error messages and/or codes. The error messages and/or codes may be transmitted using various techniques such as SMS messaging/text or note to a manager, etc.

Figure 2:
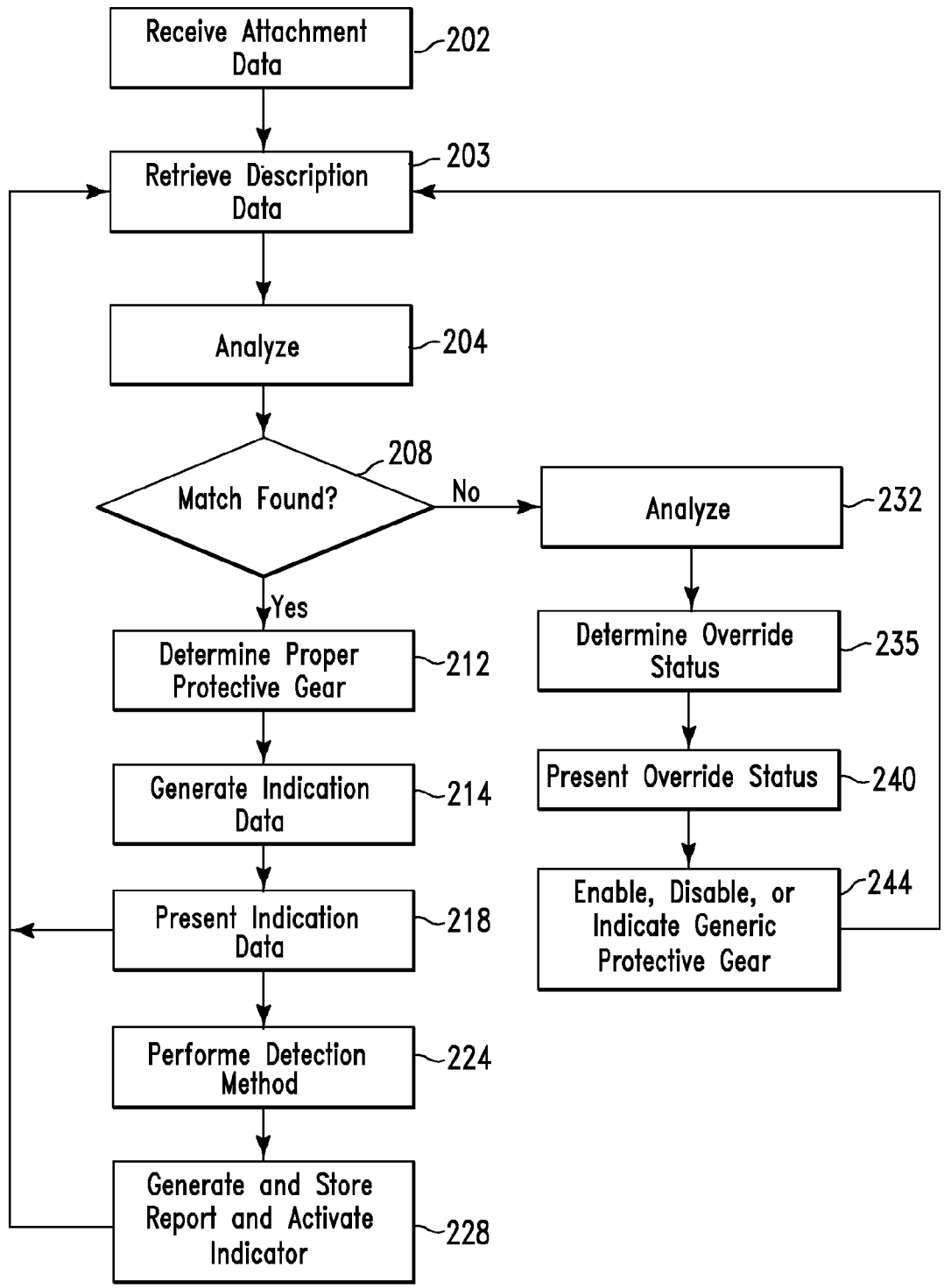
FIG. 2 illustrates a flowchart describing an algorithm used by the system of FIG. 1 for detecting and analyzing an attachment(s) for an electro/mechanical apparatus, in accordance with embodiments of the present invention.

FIG. 2 illustrates a flowchart describing an algorithm used by system 5 of FIG. 1 for detecting and analyzing attachment(s) for an electro/mechanical apparatus, in accordance with embodiments of the present invention. In step 202, a computer processor of a computing system (e.g., computing system 10 of FIG. 1) receives attachment data (and/or updates to previously loaded attachment data) describing different attachments (e.g., attachment(s) 20a of FIG. 1) associated with and attachable to an electro/mechanical apparatus (e.g., electro/mechanical apparatus 20). The attachment data (e.g., in a list format) describes usages (e.g., a masonry saw blade) and details (e.g., a size or shape of teeth on a saw blade) for common attachments for the electro/mechanical apparatus. In step 203, the computer processor retrieves (from a detection device such as detection device 24 of FIG. 1) description data describing an attachment device(s) currently attached to the electro/mechanical apparatus. The description data describes a type and usage for the attachment. In step 204, the computer processor analyzes the attachment data with respect to the description data. In step 208, it is determined (by the computer processor in response to results of the analysis in step 208) if a match is found between the attachment data and the description data.

If in step 208, it is determined that a match is found between the attachment data and the description data then in step 212, the computer processor determines (i.e., in response to match) specified protective gear required for operation of the electro/mechanical apparatus and attachment device currently attached to the electro/mechanical apparatus. In step 214, the computer processor generates indication data specifying required usage of the specified protective gear. In step 218, the computer processor presents (i.e., to a user of the electro/mechanical apparatus) the indication data and step 203 is repeated to continue monitoring. Alternatively, the computer processor may present (i.e., to a user of the electro/mechanical apparatus) the indication data and in step 224, the computer processor may perform a detection method comprising:
1. Retrieving (from the detection device) detection data indicating that the user is located within a specified proximity of the electro/mechanical apparatus.
2. Retrieving (from the detection device) safety gear detection data indicating that the user is correctly wearing the specified protective gear.
3. Retrieving (from the detection device) safety gear indication data indicating that the specified protective gear comprises a first unique marking indicating a correct type of protective gear associated with the specified protective gear and using the electro/mechanical apparatus with the attachment device(s) currently attached.
4. Analyzing the detection data, the safety gear detection data, and the safety gear indication data.
5. Enabling/disabling (in response to results of the analyzing) the electro/mechanical apparatus.

In step 228, the computer processor generates and stores a report and enables an indicator associated with results of the detection method of step 224 and step 203 is repeated to continue monitoring.

If in step 208, it is determined that a match is not found between the attachment data and the description data then in step 232, the computer processor analyzes the description data with respect to override data. In step 235, the computer processor determines (i.e., in response to results of analysis of step 232) an override status associated with operation of electro/mechanical apparatus and the attachment device currently attached to the electro/mechanical apparatus. In step 240, the computer processor presents (to the user) the override status. In step 244, the computer processor performs one of the following three functions (i.e., based on the override status) and step 203 is repeated to continue monitoring:
1. The override status indicates that the electro/mechanical apparatus may be enabled and therefore the computer processor enables the electro/mechanical apparatus.
2. The override status indicates that the electro/mechanical apparatus should be shut down and therefore the computer processor disables the electro/mechanical apparatus.
3. The override status indicates generic protective gear required for operation of the electro/mechanical apparatus and therefore the computer processor generates and present (to the user) indication data specifying required usage of the generic protective gear.

Figure 3:
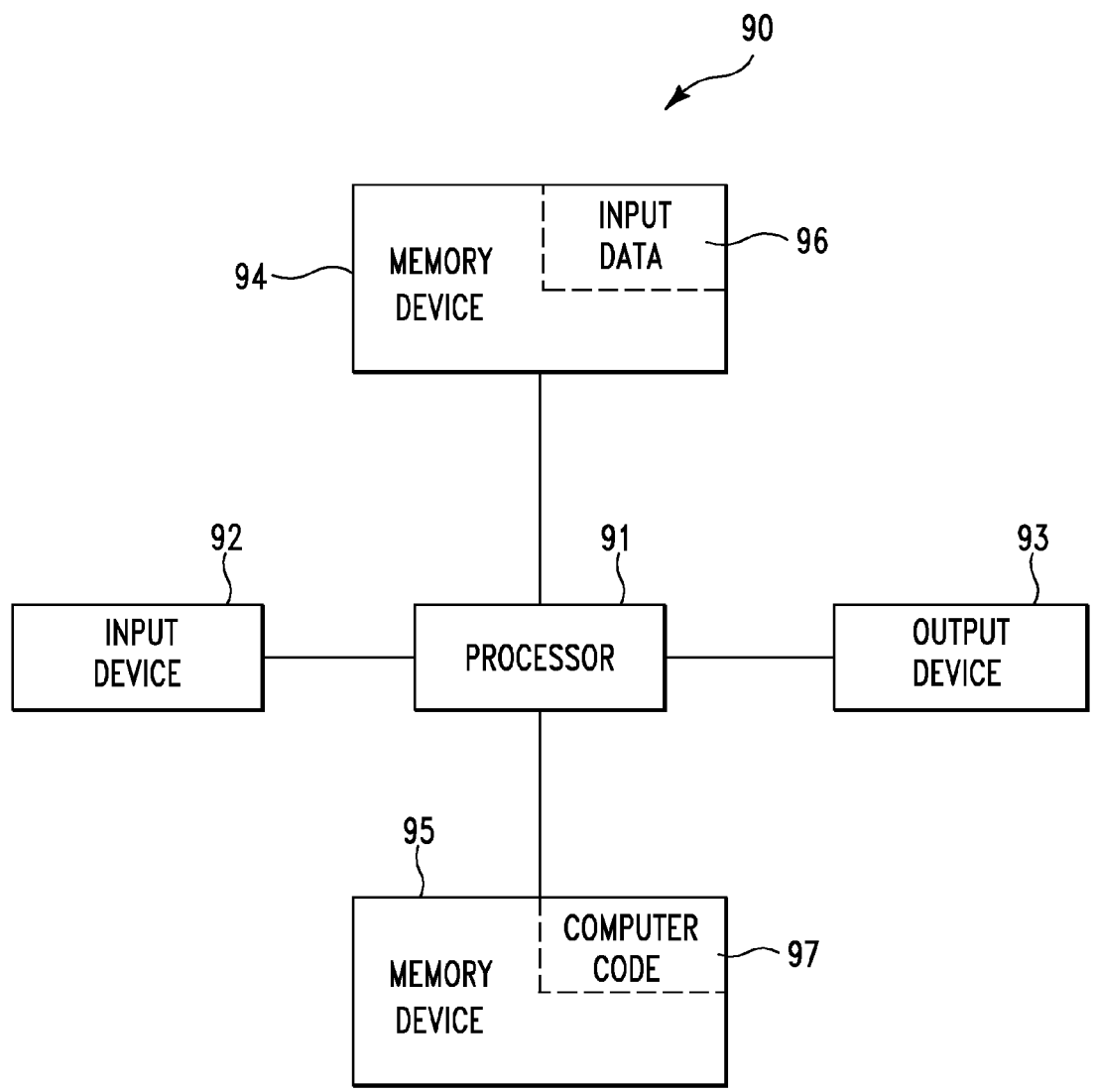
FIG. 3 illustrates a computer apparatus used by the system of FIG. 1 for detecting and analyzing an attachment(s) for an electro/mechanical apparatus, in accordance with embodiments of the present invention.

FIG. 3 illustrates a computer apparatus 90 (e.g., computing system 10 of FIG. 1) used for detecting and analyzing attachment(s) for an electro/mechanical apparatus, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for detecting and analyzing attachment(s) for an electro/mechanical apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to detect and analyze attachment(s) for an electro/mechanical apparatus. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for detecting and analyzing attachment(s) for an electro/mechanical apparatus. In another embodiment, the invention provides a method that performs the process steps of the invention on a subscription, advertising, and/or fee basis. That is, a service provider, such as a Solution Integrator, could offer to detect and analyze attachment(s) for an electro/mechanical apparatus. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

receiving, by a computer processor of a computing system, attachment data describing different devices associated with and attachable to an electro/mechanical apparatus;

retrieving, by said computer processor from a detection device, first data describing a first attachment device currently attached to said electro/mechanical apparatus, wherein said first data describes a type and usage for said first attachment;

analyzing, by said computer processor, said attachment data with respect to said first data;

determining, by said computer processor in response to results of said analyzing, a first match between said attachment data and said first data;

determining, by said computer processor in response to said first match, first specified protective gear required for operation of said electro/mechanical apparatus and said first attachment device currently attached to said electro/mechanical apparatus;

generating, by said computer processor, first indication data specifying required usage of said first specified protective gear;

presenting, by said computer processor to a user of said electro/mechanical apparatus, said first indication data;

retrieving, by said computer processor from said detection device, first detection data indicating that said user is located within a specified proximity of said electro/mechanical apparatus;

retrieving, by said computer processor from said detection device, first safety gear detection data indicating that said user is correctly wearing said first specified protective gear;

retrieving, by said computer processor from said detection device, first safety gear indication data indicating that said first specified protective gear comprises a first unique marking indicating a correct type of protective gear associated with said first specified protective gear and using said electro/mechanical apparatus with said first attachment device currently attached, wherein said first unique marking further indicates a specified class of said first specified protective gear and a specified protection level within said specified class;

analyzing, by said computer processor, said first detection data, said first safety gear detection data, and said first safety gear indication data; and enabling, by said computer processor in response to results of said analyzing said first detection data, said first safety gear detection data, and said first safety gear indication data, said electro/mechanical apparatus.

2. The method of claim 1, further comprising:

retrieving, by said computer processor from said detection device, detection data indicating that said first attachment device has been removed from said electro/mechanical apparatus;

retrieving, by said computer processor from said detection device, second data describing a second attachment device currently attached to said electro/mechanical apparatus, wherein said second data describes a type and usage for said second attachment, and wherein said second attachment device differs from said first attachment device;

first analyzing, by said computer processor, said attachment data with respect to said second data;

determining, by said computer processor in response to results of said first analyzing, a second match between said attachment data and said second data;

determining, by said computer processor in response to said second match, second specified protective gear required for operation of said electro/mechanical apparatus and said second attachment device currently attached to said electro/mechanical apparatus, wherein said second specified protective gear differs from said first specified protective gear;

generating, by said computer processor, second indication data specifying required usage of said second specified protective gear; and presenting, by said computer processor to said user of said electro/mechanical apparatus, said second indication data.

3. The method of claim 1, further comprising:

retrieving, by said computer processor from said detection device, detection data indicating that a second attachment device has been attached to said electro/mechanical apparatus, wherein said second attachment device is in addition to said first attachment device;

retrieving, by said computer processor from said detection device, second data describing said second attachment device currently attached to said electro/mechanical apparatus, wherein said second data describes a type and usage for said second attachment;

first analyzing, by said computer processor, said attachment data with respect to said second data;

determining, by said computer processor in response to results of said first analyzing, a second match between said attachment data and said second data;

determining, by said computer processor in response to said second match, second specified protective gear required for operation of said electro/mechanical apparatus and said second attachment device currently attached to said electro/mechanical apparatus, wherein said second specified protective gear differs from said first specified protective gear;

generating, by said computer processor, second indication data specifying required usage of said second specified protective gear; and presenting, by said computer processor to said user of said electro/mechanical apparatus, said second indication data.

4. The method of claim 3, wherein said second indication data specifies required usage of said second specified protective gear in addition to said first specified protective gear.

5. The method of claim 1, wherein said detection device comprises an optical detection device.

6. The method of claim 1, wherein said detection device comprises an RFID based detection device.

7. The method of claim 1, wherein said first specified protective gear comprises safety gear selected from the group consisting of safety eyewear, safety respiratory equipment, and safety body protective gear.

8. The method of claim 1, further comprising:
generating, by said computer processor, a report indicating said first indication data; and
transmitting, by said computer processor to a safety regulator, said report.

9. The method of claim 1, further comprising:
retrieving, by said computer processor from said detection device, indication data indicating that said first attachment device comprises a first unique marking correlating to a type or use of said first attachment device;
analyzing, by said computer processor, said indication data, wherein said enabling, is further in response to results of said said analyzing said indication data.

10. The method of claim 1, further comprising:
providing at least one support service for at least one of creating, integrating, hosting, maintaining, and deploying computer-readable code in said computing system, wherein the code in combination with the computing system is capable of performing: said receiving, said retrieving, said analyzing, said determining said first match, said determining said first specified protective gear, said generating, and said presenting.

11. A computer program product, comprising a non-transitory computer storage medium comprising a computer readable program code stored therein, said computer readable program code configured to perform the method of claim 1 upon being executed by said computer processor.

12. A computing system comprising said processor coupled to a computer-readable memory unit, said memory unit comprising a computer readable code configured to be executed by the processor to perform the method of claim 1.

13. A method comprising:
receiving, by a computer processor of a computing system, attachment data describing different devices associated with and attachable to an electro/mechanical apparatus;
retrieving, by said computer processor from a detection device, first data describing a first attachment device currently attached to said electro/mechanical apparatus, wherein said first data describes a type and usage for said first attachment;
first analyzing, by said computer processor, said attachment data with respect to said first data;
determining, by said computer processor in response to results of said analyzing, that a match does not exist between said attachment data and said first data;
second analyzing, by said computer processor, said first data with respect to override data;
determining, by said computer processor in response to results of said second analyzing, an override status associated operation of said electro/mechanical apparatus and said first attachment device currently attached to said electro/mechanical apparatus;
determining, by said computer processor in response to said override data, first specified protective gear required for operation of said electro/mechanical apparatus and said first attachment device currently attached to said electro/mechanical apparatus;
generating, by said computer processor, first indication data specifying required usage of said first specified protective gear;
presenting, by said computer processor to a user of said electro/mechanical apparatus, said override status and said first indication data;
retrieving, by said computer processor from said detection device, first detection data indicating that said user is located within a specified proximity of said electro/mechanical apparatus;
retrieving, by said computer processor from said detection device, first safety gear detection data indicating that said user is correctly wearing said first specified protective gear;
retrieving, by said computer processor from said detection device, first safety gear indication data indicating that said first specified protective gear comprises a first unique marking indicating a correct type of protective gear associated with said first specified protective gear and using said electro/mechanical apparatus with said first attachment device currently attached, wherein said first unique marking further indicates a specified class of said first specified protective gear and a specified protection level within said specified class;
analyzing, by said computer processor, said override status, said first detection data, said first safety gear detection data, and said first safety gear indication data; and
enabling, by said computer processor in response to results of said analyzing said override status, said first detection data, said first safety gear detection data, and said first safety gear indication data, said electro/mechanical apparatus.

14. The method of claim 13, wherein said override status indicates that said electro/mechanical apparatus may be enabled, and wherein said enabling is further in response to said override data.

15. The method of claim 13, wherein said override status indicates that said electro/mechanical apparatus may be shut down, and wherein said method further comprises:
disabling, by said computer processor in response to said override status, said electro/mechanical apparatus.

16. The method of claim 13, wherein said detection device comprises an optical detection device.

17. The method of claim 13, wherein said detection device comprises an RFID based detection device.

18. The method of claim 13, further comprising:
providing at least one support service for at least one of creating, integrating, hosting, maintaining, and deploying computer-readable code in said computing system, wherein the code in combination with the computing system is capable of performing: said receiving, said retrieving, said analyzing, said determining said match, said determining said first specified protective gear, said generating, and said presenting.

19. The method of claim 1, further comprising:
performing, by said computer processor, a facial recognition process of said user; and
first determining, by said computer processor in response to results generated during said performing said facial recognition process, that said first specified protective gear is located within a specified unique zone on said user, wherein said enabling is further in response to said performing and said first determining.

20. The method of claim 13, further comprising:
performing, by said computer processor, a facial recognition process of said user; and
first determining, by said computer processor in response to results generated during said performing said facial recognition process, that said first specified protective gear is located within a specified unique zone on said user, wherein said enabling is further in response to said performing and said first determining.

* * * * *